(12) United States Patent  
Goetzelmann et al.

(10) Patent No.: US 8,882,181 B2  
(45) Date of Patent: Nov. 11, 2014

(54) CRASH STRUCTURE HAVING ADJUSTABLE RIGIDITY FOR A DEFORMATION ELEMENT FOR A VEHICLE

(75) Inventors: Bernd Goetzelmann, Rutesheim (DE); Thomas Friedrich, Freiberg A. N. (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 13/811,614

(22) PCT Filed: Jul. 6, 2011

(86) PCT No.: PCT/EP2011/061359
§ 371 (c)(1),
(2), (4) Date: Apr. 9, 2013

(87) PCT Pub. No.: WO2012/010417
PCT Pub. Date: Jan. 26, 2012

(65) Prior Publication Data
US 2013/0207407 A1    Aug. 15, 2013

(30) Foreign Application Priority Data

Jul. 21, 2010 (DE) .......................... 10 2010 031 591

(51) Int. Cl.
*B60R 19/34* (2006.01)
*F16F 7/12* (2006.01)
*B60R 19/26* (2006.01)

(52) U.S. Cl.
CPC . *B60R 19/34* (2013.01); *F16F 7/12* (2013.01); *B60R 2019/262* (2013.01)
USPC .............. 296/187.03; 296/187.09; 296/187.1; 293/133; 188/377

(58) Field of Classification Search
CPC ...... B60R 19/34; B60R 2019/262; F16F 7/12
USPC ................ 293/133, 155; 296/187.03, 187.09, 296/187.1, 187.11; 188/371, 376, 377
See application file for complete search history.

(56) References Cited

U.S. PATENT DOCUMENTS 3,893,726 A      7/1975  Strohschein
7,195,305 B2 *   3/2007  Urushiyama et al. .... 296/187.03
8,762,008 B2 *   6/2014  Marchthaler et al. ........... 701/46

FOREIGN PATENT DOCUMENTS

DE    19745656    4/1999
DE    19860249    7/2000
EP     1792786    6/2007
EP     2014517    1/2009

OTHER PUBLICATIONS

International Search Report for Application No. PCT/EP2011/061359 dated Oct. 20, 2011 (2 pages).

* cited by examiner

*Primary Examiner* — Dennis H Pedder
*Assistant Examiner* — Beverly Becker
(74) *Attorney, Agent, or Firm* — Michael Best & Friedrich LLP

(57) ABSTRACT

The invention relates to a crash structure having adjustable rigidity for a deformation element for a vehicle, wherein the crash structure comprises a continuously adjustable rigidity, in that at least one blocking element (SR) moves in a plane rotated by an angle relative to the vehicle longitudinal axis with respect to a profile (MW), so that the rigidity is adjusted by a position of the at least one blocking element reached by the motion.

10 Claims, 3 Drawing Sheets

CRASH STRUCTURE HAVING ADJUSTABLE RIGIDITY FOR A DEFORMATION ELEMENT FOR A VEHICLE

BACKGROUND OF THE INVENTION

The invention relates to a crash structure having adjustable rigidity for a deformation element for a vehicle.

EP 1 792 786 A2 discloses a crash box which has a housing-like deformation profile having a longitudinal-member-side flange plate and which is formed as a folding construction of sheet metal. The deformation profile comprises two shell components, a flange plate portion being formed on each shell component. The shell components are folded from initial plates of sheet metal, subsequently fitted together and joined together by means of resistance welding points. This constitutes a conventional crash box without any adaptation to a crash event. However, such an adaptation is known, for example, from DE 197 45 656 A1. In this instance, an impact absorber for a motor vehicle is proposed, a deformation being able to be controlled in accordance with a pre-crash signal, that is to say, a signal of an all-round vision sensor system, as in a radar sensor system or an impact signal. It is proposed that sliding members move on a deformation element perpendicularly relative to the force direction and deformation elements are thereby locked so that, owing to the force action, these deformation elements dissipate crash energy by means of plastic deformation owing to the locking action. Owing to a parallel arrangement or by such deformation elements being constructed one inside the other, adaptation to the crash event is possible. As another example, it is proposed that a deformation element be used to dissipate crash energy by means of tapering. In this instance, one element for tapering is fixed and another can be released by a sliding member in order to reduce the tapering. The movement of the sliding member is carried out in a radial manner, that is to say, perpendicularly relative to the force direction and consequently relative to the longitudinal axis of the deformation element, conventionally a cylinder having a predetermined wall thickness.

SUMMARY OF THE INVENTION

The crash structure according to the invention having adjustable rigidity for a deformation element for a vehicle accordingly has the advantage that stepless adjustment of the rigidity is possible in that at least one locking element in a plane which is rotated through an angle with respect to the longitudinal direction of the vehicle moves in relation to a profile so that, owing to a position of the at least one locking element reached owing to the movement, the rigidity is adjusted. Consequently, by means of linear or rotational movements of the locking element, actions can be carried out on the profile in order to adjust the rigidity, for example, by the diameter of the profile thereby being reduced, by an air gap being decreased or increased by the movement of the locking element. Consequently, the adaptation of the rigidity may be optimally adjusted to the present crash. A compromise between two previously determined stages is no longer necessary. However, solutions are also possible which do not involve an air gap.

The term "crash structure" is intended in this instance to be understood to be a structural element which is fitted on the vehicle front between the transverse member and the respective longitudinal members in order in the event of a crash to protect the longitudinal member from deformation to the greatest possible extent in order to consequently reduce the repair costs. The crash structure may be replaced after a crash, which is substantially more economical than total loss in the event of deformation of the longitudinal member. The crash structure is constructed in this instance in an adaptive manner, that is to say, with adjustable rigidity in accordance with the crash event. This rigidity is adjusted for a deformation element, for example, a pipe, which is connected to the transverse member and the deformation of this pipe reduces the load on the remaining vehicle structure or consumes crash energy. The vehicle in this instance is a passenger vehicle or a small delivery van. However, other vehicle types are also possible.

The crash structure is primarily adjusted in a stepless manner with respect to the rigidity thereof. The term "stepless" means that any rigidity value which is desired can be adjusted. Depending on the technical configuration, however, there is generally a ratchet action. However, this ratchet action is so small that it is possible to refer to stepless adjustment of the rigidity.

The locking element involves sliding rings which act on the profile, by means of which, for example, the deformation element is driven, with respect to the opening thereof. The extent of the opening indicates the rigidity, then the deformation element is tapered by the profile; the degree of tapering thus also determines the rigidity.

The at least one locking element is moved relative to the profile in a plane which is rotated through an angle relative to the longitudinal direction of the vehicle. As can be seen from the dependent claims, this may be the case, for example, in a plane which is orientated perpendicularly relative to the longitudinal direction of the vehicle, or about a plane which is rotated through a few degrees relative to the perpendicular. It is consequently possible, owing to this movement which, as stated, may be rotary or linear, for a position to be reached with which the rigidity is adjusted.

Owing to the measures and development which are set out in the dependent claims, advantageous improvements of the crash structure set out in the independent patent claim having the adjustable rigidity for a deformation element for a vehicle are possible.

As set out above, it is advantageous to take an angle of 90°, that is to say, perpendicular, for the plane in which the locking element moves. This enables particularly simple and uncomplicated construction. The deceleration together with the mass/inertia in the crash direction consequently has only a small influence or even no influence at all on the adjustment of the rigidity.

Advantageously, the at least one locking element is supported by a support which is fixed to a housing. The term "housing" in this instance is intended to refer to the housing of the crash structure. This support determines in term of its shape how the at least one locking element can move. That is to say, the movement times and movement speeds of the at least one locking element can be influenced by the design of the support which is fixed to the housing. The support which is fixed to the housing may advantageously be constructed so as to be planar, which can be produced in a particularly simple manner, concave or convex. The concave or convex adjustment has the advantage that actuation times are reduced, or a constant wedge angle is formed with the profile.

Furthermore, it is advantageous for the profile to comprise a plurality of segments, an air gap for adjusting the rigidity being provided between the segments. For example, if the profile is a pipe or a tubular element and is composed of segments between which there is at least partially an air gap, this air gap can be used to determine the diameter and consequently the rigidity of the profile. These elements may, for example, be connected to flexible springs.

Furthermore, it is advantageous for the movement of the at least one locking element to be rotational, the at least one locking element being constructed as a cam. This means that the locking element rotates, that is to say, carries out a rotational movement, and it is thus constructed as a cam and can therefore give to the profile a corresponding impulse in order, for example, to decrease or increase an air gap.

An alternative advantageous embodiment is for the profile to be surrounded by a clamp which is opened or closed by a first drive as the locking element. By means of a drive, for example, a motor or a gear mechanism, the clamp can be accordingly opened in order to adjust a correspondingly weaker rigidity if it is assumed, which is generally the case, that the basic adjustment of a crash-active structure will always be the maximum rigidity.

In another alternative embodiment, the profile may be surrounded by a flexible structure as the locking element, the flexible structure being moved by a second drive. A type of sling is thereby placed around the profile and may, for example, be secured at one end, and, at the other end, the flexible structure is pulled by a drive, for example, a motor or a gear mechanism, so that air gaps which are located in the profile are decreased and greater rigidity is thereby achieved. In another direction, it is possible for the motor to give way so that the air gaps take up a wider form again. The flexible structure may advantageously be a band or cable of metal or also a chain-like structure.

In place of air gaps, it is also possible to use, for example, desired breaking points.

BRIEF DESCRIPTION OF THE DRAWINGS

Embodiments of the invention are illustrated in the drawings and are explained in greater detail in the following description.

In the drawings.

DETAILED DESCRIPTION

Figure 1:
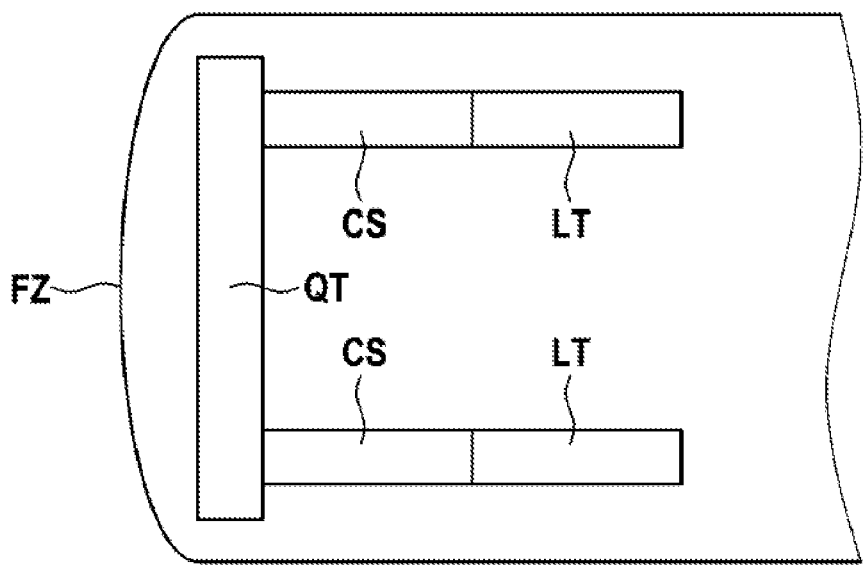
FIG. 1 is a block diagram which sets out the installation of the crash structure, FIGS. 2a and b show structures with various linearly movable locking elements.

FIG. 1 is a schematic illustration of where the crash structure CS is used in the vehicle FZ. The crash structure CS is located between a transverse member QT and the longitudinal members LT, respectively. As set out above, the function of the crash structure CS is to protect the longitudinal member LT to the greatest possible extent from many crashes in order to prevent a deformation of these longitudinal members LT and thus to prevent total loss of the vehicle FZ. According to the invention, the crash structures have steplessly adjustable rigidity.

Figure 2A:
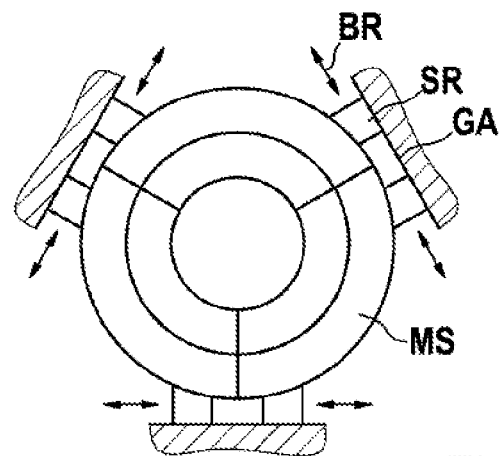

FIG. 2 illustrates a stepless adjustment possibility of an adaptive crash structure according to the invention by means of a displacement of locking elements SR in directions BR which are substantially perpendicular relative to the crash direction. The locking elements SR are supported by means of supports GA which are secured to the housing so that their movement direction is predetermined. The locking elements SR may, for example, be moved by means of electric motors or other drives. In this instance in FIG. 2a, the locking elements SR move outwards in order to bring about a lower level of rigidity of the tapering element with the matrix segments MS since the deformation element, when penetrating the tapering element, will press through the opening of the matrix segments MS as far as the locking elements SR and thus bring about an expansion and consequently achieve a lower level of rigidity. The matrix segments MS may have desired breaking points which are indicated by the lines which can be seen radially in the matrix segments MS.

Figure 2B:
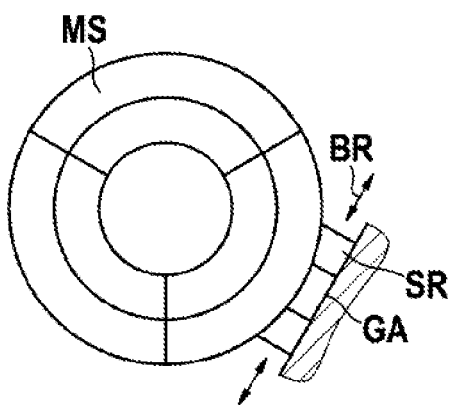

As illustrated in FIG. 2b, the locking elements SR may be arranged at various angles with respect to possible desired breaking points or other sub-divisions of the matrix segments MS. In this instance, two locking elements SR are moved in opposing directions relative to each other on a support GA. The support GA is formed in such a manner that the matrix segments MS are given more space to disengage in a direction of the support GA. The support GA does not have to be planar in this instance.

Figure 3:
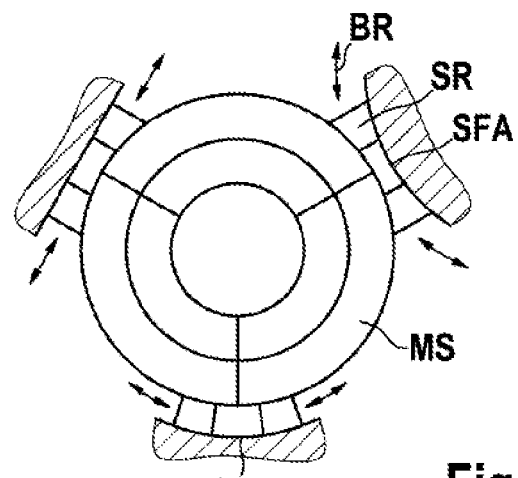
FIG. 3 shows a structure with various supports which are secured to a housing.

FIG. 3 shows that there are also other support elements, that is to say, in addition to the planar support ES also a support face SFA which forms with the matrix an increasing wedge angle in order to reduce actuation times. The support face SFB forms with the matrix a constant wedge angle for the locking element gap.

Figure 4:
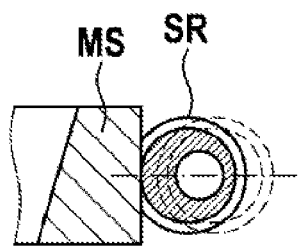
FIG. 4 shows a first embodiment having a locking element which is constructed in an eccentric manner.
Figure 4:
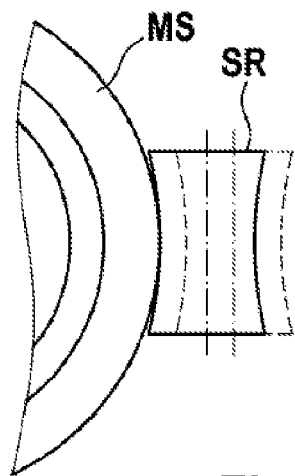
Figure 5:
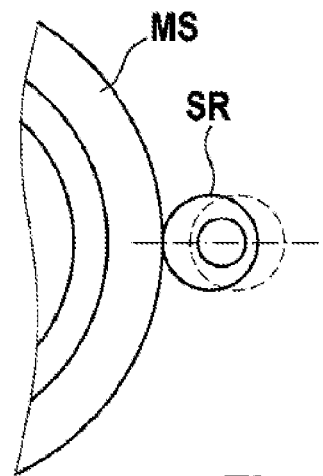
FIG. 5 shows a second embodiment having a locking element which is constructed in an eccentric manner.

FIGS. 4 and 5 each show embodiments of the matrix segments of an adaptive crash structure in accordance with the principle of tapering via a cam. The rotation axis of the cam SR may extend in a skewed manner, as in FIG. 4, or also in an axially parallel manner with respect to the matrix axis, as shown in FIG. 5. The rotation axis of the cam is fixed to the housing. FIG. 4 shows at the top a cross-section of the plan view illustrated below.

Figure 6:
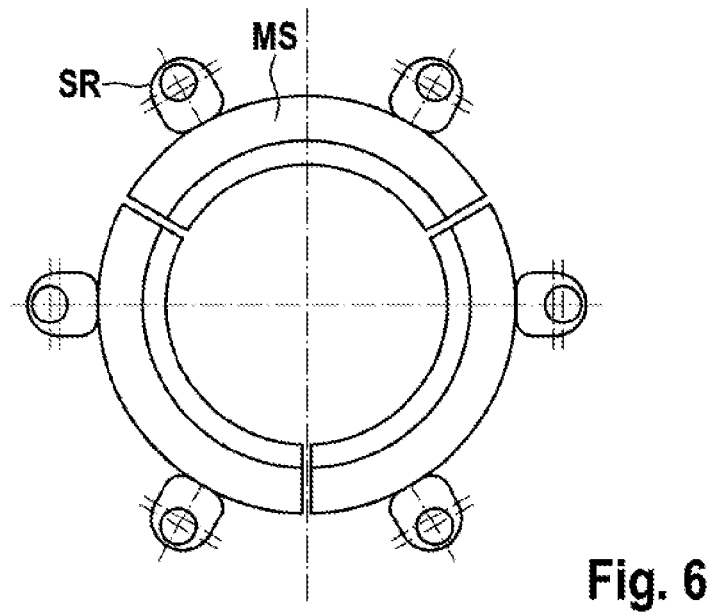
FIG. 6 shows an embodiment having six locking elements which are constructed in an eccentric manner.
Figure 7:
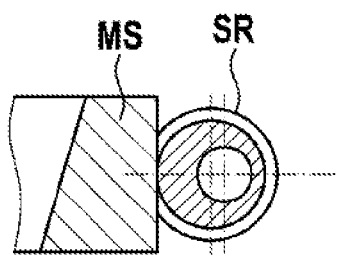
FIG. 7 is a cross-section through the locking element and a portion of a matrix element and FIG. 8 shows an embodiment having a cable which is wound around a tapering element which comprises a plurality of matrix elements.

As illustrated in FIG. 6, the cams SR may also be configured in such a manner that, in the stiffest setting, a type of grid arrangement is produced so that the cams SR cannot expand in an undesirable manner in the event of a crash. FIG. 7 shows this in cross-section.

Another embodiment not illustrated in the drawings is one in accordance with the pipe clip principle in which, for example, a two-part matrix at opposing sides is divided. At one of the two sides, the matrix segments are connected to each other by means of an articulation and, at the other side, the two segments are held together by a pin which is moved if necessary in order to open the matrix in the pipe clip. In place of the pin, however, there may also be used an actuator or gear mechanism, for example, a rack and pinion gear, with which the expansion of the matrix (pipe clip) can be adjusted in a stepless manner.

Figure 8:
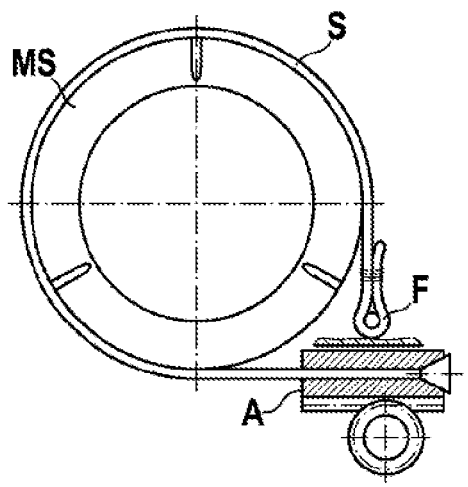

FIG. 8 shows another variant in which the principle has been expanded with respect to the wrap-around band principle. A band or cable S or also a flat cable surrounds the segments MS. In order to adjust a specific matrix opening, the band, cable or impact cable S is given space correspondingly by means of a gear mechanism or an actuator system A so that the matrices MS are retained only after the previously fixed expansion of the band S. The matrix opening may in principle also be reduced after expansion. In place of a band or a cable, a chain or a chain-like subassembly, for example, support portions which are connected by means of articulations, can also be used.

The present invention, in addition to the tapering principle, can also be adapted to other operating principles of deformation, such as, for example, abrasion, expansion, lengthening, etcetera.

The invention claimed is:

1. A crash structure (CS) having adjustable rigidity for a deformation element for a vehicle (FZ), characterized in that the crash structure (CS) has a stepless, adjustable rigidity with at least one locking element (SR) moving in a plane which is rotated through an angle with respect to a longitudinal direction of the vehicle in relation to a profile so that, owing to a position of the at least one locking element (SR) reached owing to the movement, the rigidity is adjusted.

2. The crash structure as claimed in claim 1, characterized in that the angle is 90°.

3. The crash structure as claimed in claim 1, characterized in that the at least one locking element (SR) is supported by a support (GA) which is fixed to a housing.

4. The crash structure as claimed in claim 3, characterized in that the support (GA) which is fixed to a housing is planar, concave or convex.

5. The crash structure as claimed in claim 1, characterized in that the profile comprises a plurality of segments (MS), wherein an air gap for stepless adjustment of the rigidity is provided between the segments (MS).

6. The crash structure as claimed in claim 1, characterized in that the movement of the at least one locking element (SR) is rotational, wherein the at least one locking element (SR) is constructed as a cam.

7. The crash structure as claimed in claim 1, characterized in that the profile is surrounded by a clamp, which is opened by a first drive as the locking element.

8. The crash structure as claimed in claim 1, characterized in that the profile (MS) is surrounded by a flexible structure as the at least one locking element (SR), wherein the flexible structure (S) is moved by a second drive.

9. The crash structure as claimed in claim 8, characterized in that the flexible structure is a band or a cable (S).

10. The crash structure as claimed in claim 8, characterized in that the flexible structure (S) is chain-like.

* * * * *